(12) United States Patent
Gonnet

(10) Patent No.: US 6,836,770 B2
(45) Date of Patent: Dec. 28, 2004

(54) METHOD FOR TRANSFORMING SQL QUERIES

(75) Inventor: Gaston Henry Gonnet, Zurich (CH)

(73) Assignee: Joint Technology Corporation, Waterloo (CA)

( * ) Notice: Subject to any disclaimer, the term of this patent is extended or adjusted under 35 U.S.C. 154(b) by 269 days.

(21) Appl. No.: 10/217,954

(22) Filed: Aug. 9, 2002

(65) Prior Publication Data

US 2004/0030679 A1 Feb. 12, 2004

(51) Int. Cl.⁷ .............................................. G06F 17/30
(52) U.S. Cl. ...................... 707/3; 707/4; 707/5; 706/51
(58) Field of Search ............................. 707/2, 3, 4, 5; 706/51

(56) References Cited

U.S. PATENT DOCUMENTS

| | | | | |
|---|---|---|---|---|
| 5,724,570 A | * | 3/1998 | Zeller et al. ..................... | 707/3 |
| 5,822,747 A | * | 10/1998 | Graefe et al. ................... | 707/2 |
| 5,822,750 A | * | 10/1998 | Jou et al. ........................ | 707/2 |
| 5,978,789 A | * | 11/1999 | Griffin et al. .................. | 707/2 |
| 2002/0123984 A1 | * | 9/2002 | Prakash ......................... | 707/1 |

* cited by examiner

*Primary Examiner*—Charles Rones
(74) *Attorney, Agent, or Firm*—Beyer Weaver & Thomas LLP

(57) ABSTRACT

A computer-implemented method for transforming an SQL query having a WHERE clause having nested SELECT expressions. The expression in the WHERE clause being transformed by the iterative application of rules to have ThereExists expressions and associated truth-value expressions. Further transforming the expression to form a truth expression having the IS operator and iteratively applying further rules to translate 3-valued logic to z-valued logic. Carrying out a further transformation to remove NOT expressions from the expression and to remove any There-Exists expressions so as to define an expression in z-valued logic with simplified SELECT expressions.

32 Claims, 1 Drawing Sheet

METHOD FOR TRANSFORMING SQL QUERIES

FIELD OF THE INVENTION

This invention relates to computer-implemented methods and in particular to a computer-implemented method for the transformation of SQL queries.

BACKGROUND OF THE INVENTION

The SQL (Structured Query Language) language provides mechanisms for users to define queries to a database. Because of its richness and the number of available implementations, SQL has become a widely used language. A standard definition of the SQL database query language is the ISO 90975 standard. SQL as defined in ISO 90975 and in the SQL3 standard supports 3-valued logic: all truth values in the language may be TRUE, FALSE or UNKNOWN. This means that values can be NULL (meaning unknown or unspecified) and use of these NULL values in predicates results in UNKNOWN truth values. The ISO 90975 standard is defined such that compliant database systems accept these NULL data values and UNKNOWN truth values and work consistently and correctly with them.

However, computers, at their hardware level and most common programming languages, work exclusively with exactly two Boolean truth values: TRUE and FALSE. Hence for a computer system that implements the SQL language to process an SQL query which is expressed in 3-valued logic, that system must be designed to carry out a simulation of the 3-valued logic to provide for all the logical operations that are possible in this SQL standard. This is typically costly in terms of execution time and the simulation itself is also error prone.

Further, the SQL language also allows the incorporation of subqueries in a query. A subquery is similar to a complete query in that it is evaluated completely every time that the expression in which it appears is evaluated. This provides the SQL language with the ability to express complex iterations over the tables in the database. On the other hand, it is inefficient to evaluate a subquery every time that an expression is evaluated. As a result, it is advantageous for query processing to include optimizations that may be carried out to make such sub-query evaluations more efficient.

It is therefore desirable to provide a computer-implemented method for transforming SQL queries such that the queries may be executed using 2-valued logic and such that the need for the evaluation of sub-queries on SQL query execution is reduced.

SUMMARY OF THE INVENTION

According to an aspect of the invention, an improved computer-implemented method of SQL query transformation is provided.

According to another aspect of the invention, a computer-implemented method is provided which uses replacement rules to transform the WHERE clause in an SQL query expressed in 3-valued logic into an equivalent query in 2-valued logic. According to another aspect of the invention, the above computer-implemented method further includes transformation rules for removing, or transforming into MINUS (set difference) operations, subqueries in the SQL query.

According to another aspect of the invention there is provided a computer-implemented method for the transformation of an SQL query including a WHERE clause having nested SELECT expressions, the method including the following steps:

iteratively transforming the nested SELECT expressions in the WHERE clause of the SQL query into a corresponding and logically equivalent first step expression whereby the first step expression is defined to include ThereExists expressions and associated truth-value expressions, generating a truth expression having the form "(search_condition) IS TRUE" where the first step expression derived from the WHERE clause defines "search_condition" in the truth expression;

transforming the truth expression by iteratively applying a set of 3-valued to 2-valued logic rules to push the IS operator to the bottom of a truth expression tree corresponding to the truth expression and to replace the resulting IS operator expressions with logically equivalent expressions such that a second step expression is defined to be logically equivalent to the truth expression and to be expressed in 2-valued logic; and transforming the second step expression by iteratively applying a set of NOT removal rules to push any NOT expressions to the bottom of a second step expression tree corresponding to the second step expression, to remove the NOT expressions and to remove the ThereExists expressions, whereby the WHERE clause is transformed to an expression in 2-valued logic in which nested SELECT expressions are simplified.

According to another aspect of the invention there is provided a computer-implemented method for the transformation of an SQL query including a WHERE clause having nested SELECT expressions, the method including the following steps:

iteratively transforming the nested SELECT expressions in the WHERE clause of the SQL query into a corresponding and logically equivalent first step expression whereby the first step expression is defined to include ThereExists expressions and associated truth-value expressions; and transforming the first step expression by iteratively applying a set of NOT removal rules to push any NOT expressions to the bottom of the first step expression tree corresponding to the first step expression, to remove the NOT expressions and to remove the ThereExists expressions, whereby the WHERE clause is transformed to an expression in which nested SELECT expressions are simplified.

According to another aspect of the invention there is provided a computer-implemented method for the transformation of an SQL query including a WHERE clause including a condition expression, the method including the following steps:

generating a truth expression having the form "(search_condition) IS TRUE" where the WHERE clause condition expression defines "search_condition" in the truth expression; and transforming the truth expression by iteratively applying a set of 3-valued to 2-valued logic rules to push the IS operator to the bottom of a truth expression tree corresponding to the truth expression and to replace the resulting IS operator expressions with logically equivalent expressions such that a second step expression is defined to be logically equivalent to the truth expression and to be expressed in 2-valued logic, whereby the WHERE clause is transformed to an expression in 2-valued logic.

According to another aspect of the invention there is provided a computer program product including a computer usable medium tangibly embodying computer readable program code means for transforming an SQL query, the computer readable program code means comprising code means for carrying out the steps of the above methods.

Advantages of the invention include a simplification of subquery evaluation and the representation of SQL queries in 2-valued logic.

BRIEF DESCRIPTION OF THE DRAWINGS

In drawings which illustrate by way of example only a preferred embodiment of the invention.

DETAILED DESCRIPTION OF THE INVENTION

Figure 1:
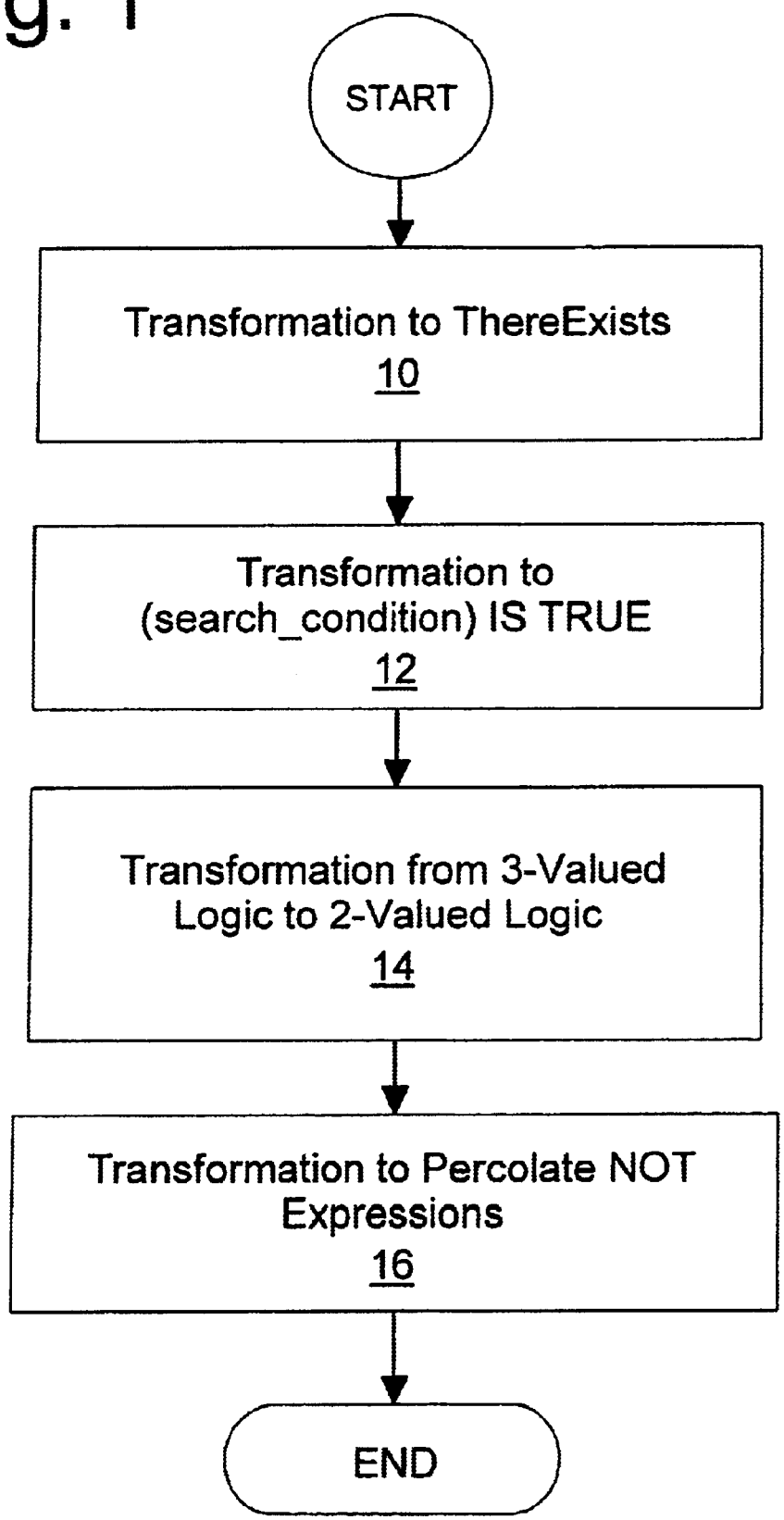
FIG. 1 is a flow-chart showing the high-level logic of the computer-implemented method of the preferred embodiment.

The preferred embodiment of the invention is a computer-implemented method (implementable in a computer program product) to transform SQL queries from 3-valued logic to 2-valued logic and includes the use of an intermediate expression called, in this description of the preferred embodiment, "ThereExists" and associated manipulations to resolve subqueries in the original SQL query. The description of the preferred embodiment presents the steps in the SQL transformation of the invention using a series of tables. These tables have two columns and illustrate an original expression on the left and the corresponding transformed or converted expression on the right. The transformations are applied to an SQL query in successive steps (or batches), and each table represents a step (or batch) in the overall SQL query transformation. In the computer-implemented method of the preferred embodiment, the order in which the tables are described is the order in which the transformations are applied to the SQL query. In the preferred embodiment, reference is made to expression trees. As will be apparent to those skilled in the art, SQL expressions may be represented in an expression tree format. Transformations of expressions will result in consequential alterations to the expression tree representations of the pre-transformation and post-transformation expressions.

FIG. 1 is a flowchart showing a high-level description of the method of the preferred embodiment. Box 10 represents the first step in the transformation. In this step, a subquery is identified (the topmost WHERE clause in the potentially nested structure of the query). Logically equivalent expressions incorporating the ThereExists expression are generated as transforms of the original subquery. This step is potentially iterative (as is the case for the example given below). The transformation of the original SQL expression to an equivalent expression with an introduction of the ThereExists expressions, and associated truth-value expressions, permits appropriate nested SQL statements to be evaluated in a more efficient manner, as is described in more detail below. The resulting expression may be referred to as a first step expression.

After the first step in the transformation of the preferred embodiment is complete, the step represented in box 12 of FIG. 1 is carried out. In this step the subquery (as transformed by the first step) takes the position of "search_condition" in the Boolean expression "(search_condition) IS TRUE." This step is based on the fact that in the SQL language a WHERE clause is effectively evaluated to determine if a search condition (defined in the WHERE clause) is true or not.

The next step in the transformation is represented as box 14 in FIG. 1. This step applies a set of rules to the transformed Boolean expression defined above with the result that the predicates of the subquery defined in the second step are reduced to trivial terms or eliminated. The transformation is carried out to effectively transform the "(search_condition) IS TRUE" expression to an equivalent expression where the IS operator has been removed. The original search_condition expression may incorporate 3-valued logic. The "(search_condition) IS TRUE" expression, however, has a result that is either TRUE or FALSE. By applying the transforms of the step of box 14 in FIG. 1, where appropriate intermediate expressions will result that include the IS operator acting on expressions that were within or were derived from the original "search_condition" expression. In this way, the "search_condition" expression is eventually transformed (by iteration of the step of box 14) to a 2-valued logic expression. Application of the transforms of box 14 also result in an expression (a second step expression) that does not contain the IS operator.

In the preferred embodiment, a final step occurs as is shown in box 16. This involves the further transformation of the expression resulting from box 14 to eliminate any ThereExists expressions. To reach the step of transforming the expression to remove ThereExists expressions, the NOT operators found in the expression are either removed or transformed to apply directly to any ThereExists expressions. If the expression defined by the step of box 14 is considered as an expression tree, the step of box 16 (an iterative application of a set of rules) carries out a migration of the NOT expressions to the bottom of the expression tree and the resulting expression is further transformed to remove the ThereExists expressions.

As will be apparent from the following description, the steps of boxes 10, 14, 16 are each iterative processes.

The following table (Table 1) shows the transformations defined in the preferred embodiment that potentially change subqueries into expressions including ThereExists expressions. This is the first stage of the transformation and is reflected by box 10 in FIG. 1. As part of the later stages of the transformation, after the elimination of 3-valued logic, these ThereExists expressions will be later further simplified and removed (as described above with respect to box 16 in FIG. 1).

TABLE 1

| Rule | From | To |
| --- | --- | --- |
| 1 | a = ANY SQ | a IN SQ |
| 2 | a op ALL SQ | NOT ( a -op ANY SQ ) |
| 3 | a IN (SELECT b WHERE d) | ThereExists( a = b AND d) |
| 4 | EXISTS (SELECT b WHERE d ) | ThereExists( d ) |
| 5 | a < ANY (SELECT b WHERE d ) | ThereExists( a < b AND d ) |
| 6 | a > ANY (SELECT b WHERE d ) | ThereExists( a > b AND d ) |
| 7 | a <= ANY (SELECT b WHERE d ) | ThereExists( a <= b AND d ) |
| 8 | a >= ANY (SELECT b WHERE d ) | ThereExists( a >= b AND d ) |
| 9 | a <> ANY (SELECT b WHERE d ) | ThereExists( a <> b AND d ) |

In Table 1, the "a", "b", and "c" represent arbitrary names or expressions or sequences of names or expressions as are allowed by the SQL standard. In Table 1, "d" indicates an arbitrary boolean expression and "SQ" a subquery. "T", "F" and "U" represent the values TRUE, FALSE and UNKNOWN, respectively. Finally, "op" stands for a comparison operator and "-op" stands for the complementary comparison operator. It will be appreciated that the definition of the rules in Table 1 are dependent on the ThereExists expression definition, on their order in the table and on other definitional choices. It will be apparent that other, equivalent rules may be defined having a different form but accomplishing the same transformations of expressions. As is the case for the other tables defined below, equivalent rules will be apparent to those skilled in the art as being alternatives to those rules set out in this description of the preferred embodiment.

To further clarify the transformations carried out by the preferred embodiment, an example is described below. The original SQL query for the example is select * from A
where A.a=1 is unknown and A.b<=all (select B.b from B where B.c=A.c)

After the first step of transformations, the WHERE clause of this SQL query (which is the only part subject to transformations) becomes (according to the 2nd rule in Table 1, above):

A.a=1 is unknown and
not (A.b>ANY (select B.b from B where B.c=A.c))

This intermediate expression is then transformed again (using the 6th rule in Table 1) with the following resulting equivalent logical expression:

A.a=1 is unknown and
not ThereExists (A.b>B.b and B.c=A.c)

In the example given, there are at this point no more rules of the first batch (the rules set out in Table 1) that can be applied.

In formal terms, ThereExists is a function which maps sets of truth values to a single truth value. The truth table for ThereExists as defined in the preferred embodiment, is as follows:

3-valued logic, the rules used to carry out the transformation will vary from those set out below. Such variations will be apparent to those skilled in the art.

The transformation to 2-valued logic is based on the fact that the 3-valued logic expressions evaluated in the condition of an SQL WHERE clause are used to decide whether a tuple of values will be part of the result returned by the execution of the WHERE clause or not (see the standard referred to as ISO 9075-7.6 GR 1). If the expression comprising the condition evaluates to TRUE for a given tuple, then the tuple is part of the table that is passed as the result. If the tuple evaluates to UNKNOWN or to FALSE then the tuple it is not part of the result. As referred to above, this is equivalent to the condition for the WHERE clause (the search_condition) being enclosed in an implicit IS predicate (see the standard ISO 9075-8.12):

(search_condition) IS TRUE

Applying this rule to the intermediate expression in the example of the preferred embodiment set out above results in the expression becoming:

(A.a=1 is unknown and
not ThereExists (A.b>B.b and B.c=A.c)) IS TRUE

As may be seen from this example, the IS predicate has an argument which is in 3-valued logic (i.e. it can be T, F or U) but its result is in 2-valued logic (i.e. it can only be T or F). This fact is the basis for a set of rules that define transformations to provide a 2-valued logic expression that is the logical equivalent of the initial expression. If the expression is considered as having an expression tree representation, the iterative application of the rules set out below results in any IS operators being pushed down the expression tree to the point where the resulting IS operators

TABLE 2

| a | {T,U,F} | {T,U} | {T,F} | {U,F} | {T} | {U} | {F} | {} |
|---|---|---|---|---|---|---|---|---|
| ThereExists (a) | T | T | T | U | T | U | F | F |

Multiple nested sub-selects in an SQL statement are handled by the preferred embodiment provided that the replacements of the transformations of Table 1 are carried out on the nested sub-selects in an innermost-first fashion.

It will be appreciated by those skilled in the art that the ThereExists expression referred to in this description of the preferred embodiment may be given other names without affecting the nature of the transformations carried out. Further, other expressions analogous to the ThereExists expression may be used where such expressions permit an SQL expression having nested sub-selects to be transformed to a logically equivalent expression where the conditions of the sub-selects are incorporated into the parent expression.

In the preferred embodiment, the ThereExists expressions are eventually removed from the transformed expression. However, in the preferred embodiment, before this step is carried out, the intermediate transformed expression is further transformed to replace 3-valued logic expressions with equivalent 2-valued logic expressions. It will be appreciated by those skilled in the art that the steps of removing sub-queries are not necessarily incorporated with the steps of transforming expressions to 2-valued logic, although they are so incorporated in the preferred embodiment. Those skilled in the art will appreciate that it is possible to implement the transformations from 3-valued to 2-valued logic expressions without implementing the transformations to remove sub-selects, and vice versa. Where the transformations to simplify sub-select expressions are carried out in may be removed from the expression tree. As the IS operators are pushed down the expression tree, the expressions defined by the upper branches of the tree are expressed in 2-valued logic. When the IS operators are pushed to the leaves of the expression tree and removed, the resulting expression is entirely defined in two-valued logic.

The mechanism to transform the 3-valued expression to a 2-valued expression is the iterative application of a set of rules (as set out in Table 3, below) on the boolean test of composite expressions, starting at the top with the "(search_condition) IS TRUE" expression according to the following table until the transformed expression is reduced to trivial terms or there are no boolean tests left. The set of rules used in the preferred embodiment is as follows:

TABLE 3

| Rule | From | To |
|---|---|---|
| 1 | (a IS tr1) OR (a IS tr2) | NOT( a IS tr3 ) |
| 2 | TRUE IS tr | tr=TRUE |
| 3 | FALSE is tr | tr=FALSE |
| 4 | UNKNOWN is tr | tr=UNKNOWN |
| 5 | (a OR b OR ...) IS TRUE | (a IS TRUE) OR (b IS TRUE) OR ... |
| 6 | (a OR b OR ...) IS FALSE | (a IS FALSE) AND (b IS FALSE) AND ... |
| 7 | (a OR b) IS UNKNOWN | NOT (a OR b IS TRUE) AND NOT (a OR b IS FALSE) |

TABLE 3-continued

| Rule | From | To |
|---|---|---|
| 8 | (a AND b) IS UNKNOWN | NOT (a AND b IS TRUE) AND NOT (a AND b IS FALSE) |
| 9 | (a AND b AND ...) IS TRUE) | (a IS TRUE) OR (b IS TRUE) AND ... |
| 10 | (a AND b AND ...) IS FALSE | (a IS FALSE) OR (b IS FALSE) OR ... |
| 11 | (NOT a) IS TRUE | a IS FALSE |
| 12 | (NOT a) IS FALSE | a IS TRUE |
| 13 | (NOT a) IS UNKNOWN | a IS UNKNOWN |
| 14 | (a IS tr) IS TRUE | a IS tr |
| 15 | (a IS tr) IS UNKNOWN | False |
| 16 | (a IS tr) IS FALSE | NOT (a IS tr) |
| 17 | (a op b) IS TRUE | a op b |
| 18 | (a <> b) IS FALSE | a = b |
| 19 | (a < b) IS FALSE | a >= b |
| 20 | (a <= b) IS FALSE | a > b |
| 21 | (a = k) IS FALSE | a = {-infinity..Prev(k),Next (k)..infinity} |
| 22 | (a = b) IS FALSE | a <> b |
| 23 | (a Op b) IS UNKNOWN | a={null} OR b={null} |
| 24 | There Exists (a) IS TRUE | There Exists (a IS True) |
| 25 | There Exists (a) IS FALSE | NOT ThereExists( NOT (a IS FALSE) ) |
| 26 | There Exists (a) IS UNKNOWN | NOT There Exists (a IS TRUE) AND ThereExists(a IS UNKNOWN) |
| 27 | a IS NOT NULL | a = {-infinity..infinity} |
| 28 | a IS NULL | a = {null} |

In Table 3, the following conventions are used: tr stands for an arbitrary truth value; tr1, tr2 and tr3 stand for a permutation of the three possible truth values; a, b, ... stand for arbitrary expressions (boolean or otherwise) as allowed by the SQL language; and k stands for a constant.

As will be appreciated by those skilled in the art, these rules, applied in the order set out above, will result in the IS operators to be moved to the bottom of the expression tree for the expression. It will also be appreciated that the definition of the rules will depend on their order and other, equivalent rules may be defined to cause the IS operators to be pushed down the expression tree and eliminated. Further, the transformations defined by the rules of FIG. 3 also depend on how the 2-valued logic operations are implemented in the evaluation of predicates. The preferred embodiment is described with reference to a system in which the various predicates (in 2-valued logic) return F every time that they compare against null. A comparison against a set of values or ranges of values is described below to indicate this aspect of the operation of the system for which the preferred embodiment is defined. It will be apparent that a different system that is based on another manner of operation will produce some non-essential changes in the transformations.

In the preferred embodiment, the 2-valued comparisons return results according to the following tables:

Table 4, below, indicates the results for a=b as illustrated with examples:

TABLE 4

| | | 3-valued logic | | | | 2-valued logic | |
|---|---|---|---|---|---|---|---|
| a | b | a = b | a = b is true | a = b is false | a = b is unknown | a = b | a <> b |
| 23 | 23 | T | T | F | F | T | F |
| 21 | 23 | F | F | T | F | F | T |
| null | 23 | U | F | F | T | F | F |
| 23 | null | U | F | F | T | F | F |
| null | null | U | F | F | T | F | F |

Table 5, below, shows the results for a<>b as illustrated with examples:

TABLE 5

| | | 3-valued logic | | | | 2-valued logic | |
|---|---|---|---|---|---|---|---|
| a | b | a <> b | a <> b is true | a <> b is false | a <> b is unknown | a = b | a <> b |
| 23 | 23 | F | F | T | F | T | F |
| 21 | 23 | T | T | F | F | F | T |
| null | 23 | U | F | F | T | F | F |
| 23 | null | U | F | F | T | F | F |
| null | null | U | F | F | T | F | F |

Finally, Table 6 shows the results for a<b as illustrated with examples (the table for a<=b is analogous):

TABLE 6

| | | 3-valued logic | | | | 2-valued logic | |
|---|---|---|---|---|---|---|---|
| a | b | a < b | a < b is true | a < b is false | a < b is unknown | a < b | a >= b |
| 23 | 23 | F | F | T | F | F | T |
| 21 | 23 | T | T | F | F | T | F |
| null | 23 | U | F | F | T | F | F |
| 23 | null | U | F | F | T | F | F |
| null | null | U | F | F | T | F | F |

Turning again to the intermediate expression of the example set out above, the effect of the rules of Table 3 may be seen. As set out above, the intermediate expression before transformation by application of the rules of Table 3 is as follows:

(A.a=1 is unknown and
not ThereExists (A.b>B.b and B.c=A.c)) IS TRUE

That expression is transformed by rule 9 of Table 3 into an expression in which the IS operator is replaced with two IS operators that are placed further down the expression tree that represents the following expression:

(A.a 1 is unknown) IS TRUE and
(not ThereExists (A.b>B.b and B.c=A.c) IS TRUE

That intermediate expression is, in turn, transformed by rules 14 and 11 in Table 3 to the following:

A.a=1 IS UNKNOWN and
ThereExists (A.b>B.b and B.c=A.c) IS FALSE

This is transformed, in turn, by rules 23 and 25 in Table 3 to become:

(A.a={null} or 1={null}) and
NOT ThereExists (NOT (A.b>B.b and B.c=A.c IS FALSE))

Evaluation of 1={null} and application of rule 10 in Table 3 are then applied to further move the IS operators down the expression tree to generate:

(A.a={null} or FALSE) and
NOT ThereExists (NOT ((A.b>B.b IS FALSE) OR (B.c= A.c IS FALSE)))

Finally, by rules 19 (reversed) and 22 in Table 3 and trivial simplification of "or FALSE", the IS operators are removed and the expression takes the form:

A.a={null} and
NOT ThereExists (NOT (A.b<=B.b OR B.c <>A.c))

As may be seen from the iterative application of the rules of Table 3 to the above example expression, the resulting transformed expression is defined in 2-valued logic, whereas the expression before the transformation was defined in 3-valued logic. As a result, the transformed expression is able to be evaluated more efficiently by binary computers.

As indicated above, in the preferred embodiment, the last step in the transformation of the expression is to remove any ThereExists expressions. In the preferred embodiment, this final phase of the transformation includes the step of percolating the NOT expressions in the intermediate expression to the bottom of expression tree. A ThereExists expression that is indirectly located below a NOT expression in the expression tree cannot be removed. The NOT expressions are therefore pushed down the expression tree using rules of boolean algebra (and some specifically defined rules also described in the Table 7, below) to define an expression where the NOT expressions are replaced or apply directly to ThereExists expressions. Any remaining ThereExists expressions can then be replaced using the rules as set out in Table 7. At the end of this phase, all the NOT expressions will have been eliminated, as will the ThereExists expressions.

The rules as defined in the preferred embodiment to carry out this step are defined in Table 7, following:

TABLE 7

| Rule | From | To |
|---|---|---|
| 1 | ThereExists (a) | a |
| 2 | NOT ( a AND b AND ...) | (NOT a) OR (NOT b ) OR ... |
| 3 | NOT ( a OR b OR ... ) | (NOT a) AND (NOT b ) AND ... |
| 4 | NOT (NOT a) | a |
| 5 | NOT (a < k) | a = {null,k..infinity} |
| 6 | NOT (k < b) | b = {null,-infinity..k} |
| 7 | NOT (a <= k) | a = {null,Next(k)..infinity} |
| 8 | NOT (k <= b) | b = {null,-infinity..Prev(k)} |
| 9 | NOT (a <> k) | a = k |
| 10 | NOT (a = k) | a = {-infinity..Prev(k), Next(k)..infinity} |
| 11 | NOT (a = b) | a<>b OR a={null} OR b={null} |
| 12 | NOT (a <> b) | a=b OR a={null} OR b={null} |
| 13 | NOT (a < b) | a>=b OR a={null} OR b={null} |
| 14 | NOT (a <= b) | a>b OR a={null} OR b={null} |
| 15 | NOT( ThereExists(a) ) | MINUS( true, a ) |

The notation of Table 7 is described as follows: a set of values enclosed in curly braces indicates that any of the values in the set may satisfy the condition. Sets of values are only used with equality operators. If the null value is included within curly braces, it is understood that the left hand side can take the null value. The notation a . . . b compares equal to any value between and including a and b. The notation Prev(k) and Next(k) indicate the previous, and next values to k for that particular data type, respectively. The MINUS operation is the set difference operator, that is all the instances which are true for the first argument and are not true for the second argument.

Turning again to the example expression referred to above, once rule 15 in Table 7 is applied (and trivial simplifications carried out), the expression becomes:

A.a={null} and
MINUS (true, NOT (A.b<=B.b OR B.c<>A.c))

By application of rule 3 in Table 7, the expression becomes:

A.a={null} and
MINUS (true, NOT (A.b<B.b) and NOT (B.c<>A.c))

By application of rules 14 and 12 in Table 7, it becomes:

A.a={null} and
MINUS (true, (A.b>B.b or A.b={null} or B.b={null}) and (B.c=A.c or B.c={null} or A.c={null}))

As may be seen from this example, the original expression has been transformed from an expression including an unknown value and a sub-query to a logically equivalent expression that is expressed in two-value logic and has no sub-queries.

The preferred embodiment of the present invention having been thus described in detail by way of example, it will be apparent to those skilled in the art that variations and modifications may be made without departing from the invention. The invention includes all such variations and modifications as fall within the scope of the appended claims.

I claim:

1. A computer-implemented method for the transformation of an SQL query comprising a WHERE clause having nested SELECT expressions, the method comprising the following steps:

a) iteratively transforming the nested SELECT expressions in the WHERE clause of the SQL query into a corresponding and logically equivalent first step expression whereby the first step expression is defined to comprise ThereExists expressions and associated truth-value expressions; and b) transforming the first step expression by iteratively applying a set of NOT removal rules to push any NOT expressions to the bottom of the first step expression tree corresponding to the first step expression, to remove the NOT expressions and to remove the ThereExists expressions, whereby the WHERE clause is transformed to an expression in which nested SELECT expressions are simplified.

2. The computer-implemented method of claim 1 in which the ThereExists expressions comprise a ThereExists function having the following properties:

| A | {T,U,F} | {T,U} | {T,F} | {U,F} | {T} | {U} | {F} | {} |
|---|---|---|---|---|---|---|---|---|
| ThereExists (a) | T | T | T | U | T | U | F | F | where "T", "F" and "U" represent the values TRUE, FALSE and UNKNOWN, respectively.

3. A computer-implemented method for the transformation of an SQL query comprising a WHERE clause comprising a condition expression, the method comprising the following steps:

a) generating a truth expression having the form "(search_condition) IS TRUE" where the WHERE clause condition expression defines "search_condition" in the truth expression; and b) transforming the truth expression by iteratively applying a set of 3-valued to 2-valued logic rules to push the IS operator to the bottom of a truth expression tree corresponding to the truth expression and to replace the resulting IS operator expressions with logically equivalent expressions such that a second step expression is defined to be logically equivalent to the truth expression and to be expressed in 2-valued logic, whereby the WHERE clause is transformed to an expression in 2-valued logic.

4. The computer-implemented method of claim 3 in which the set of 3-valued to 2-valued logic rules comprises the following rules:

| From | To |
|---|---|
| (a IS tr1) OR (a IS tr2) | NOT( a IS tr3 ) |
| TRUE IS tr | tr=TRUE |
| FALSE is tr | tr=FALSE |
| UNKNOWN is tr | tr=UNKNOWN |
| (a OR b OR ...) IS TRUE | (a IS TRUE) OR (b IS TRUE) OR ... |
| (a OR b OR ...) IS FALSE | (a IS FALSE) AND (b IS FALSE) AND ... |
| (a OR b) IS UNKNOWN | NOT (a OR b IS TRUE) AND NOT (a OR b IS FALSE) |
| (a AND b) IS UNKNOWN | NOT (a AND b IS TRUE) AND NOT (a AND b IS FALSE) |
| (a AND b AND ...) IS TRUE | (a IS TRUE) AND (b IS TRUE) AND ... |
| (a AND b AND ...) IS FALSE | (a IS FALSE) OR (b IS FALSE) OR ... |
| (NOT a) IS TRUE | a IS FALSE |
| (NOT a) IS FALSE | a IS TRUE |
| (NOT a) IS UNKNOWN | a IS UNKNOWN |
| (a IS tr) IS TRUE | a IS tr |
| (a IS tr) IS UNKNOWN | False |
| (a IS tr) IS FALSE | NOT (a IS tr) |
| (a op b) IS TRUE | a op b |
| (a <> b) IS FALSE | a = b |
| (a < b) IS FALSE | a >= b |
| (a <= b) IS FALSE | a > b |
| (a = k) IS FALSE | a ={-infinity..Prev(k),Next(k)..infinity} |
| (a = b) IS FALSE | a <> b |
| (a op b) IS UNKNOWN | a={null} OR b={null} |

| From | To |
|---|---|
| ThereExists(a) IS TRUE | ThereExists(a IS TRUE) |
| ThereExists(a) IS FALSE | NOT ThereExists( NOT (a IS FALSE) ) |
| ThereExiSts(a) IS UNKNOWN | NOT ThereExists (a IS TRUE) AND ThereExists (a IS UNKNOWN) |
| a IS NOT NULL | a = {-infinity..infinity} |
| a IS NULL | a = {null} | where "tr" represents an arbitrary truth value, "tr1", "tr2" and "tr3" represent a permutation of the three possible truth values, "a", "b", represent expressions in the SQL language, and "k" represents a constant.

5. A computer-implemented method for the transformation of an SQL query comprising a WHERE clause having nested SELECT expressions, the method comprising the following steps:

a) iteratively transforming the nested SELECT expressions in the WHERE clause of the SQL query into a corresponding and logically equivalent first step expression whereby the first step expression is defined to comprise ThereExists expressions and associated truth-value expressions, b) generating a truth expression having the form "(search_condition) IS TRUE" where the first step expression derived from the WHERE clause defines "search_condition" in the truth expression;

c) transforming the truth expression by iteratively applying a set of 3-valued to 2-valued logic rules to push the IS operator to the bottom of a truth expression tree corresponding to the truth expression and to replace the resulting IS operator expressions with logically equivalent expressions such that a second step expression is defined to be logically equivalent to the truth expression and to be expressed in 2-valued logic; and d) transforming the second step expression by iteratively applying a set of NOT removal rules to push any NOT expressions to the bottom of a second step expression tree corresponding to the second step expression, to remove the NOT expressions and to remove the ThereExists expressions, whereby the WHERE clause is transformed to an expression in 2-valued logic in which nested SELECT expressions are simplified.

6. The computer-implemented method of claim 5 in which the ThereExists expressions comprise a ThereExists function having the following properties:

| a | {T,U,F} | {T,U} | {T,F} | {U,F} | {T} | {U} | {F} | {} |
|---|---|---|---|---|---|---|---|---|
| ThereExists (a) | T | T | T | U | T | U | F | F | where "T", "F" and "U" represent the values TRUE, FALSE and UNKNOWN, respectively.

7. The computer-implemented method of claim 5 in which the step of iteratively transforming the nested SELECT expressions in the WHERE clause of the SQL query comprises the step of applying the following transformation rules:

| From | To |
| --- | --- |
| a = ANY SQ | a IN SQ |
| a op ALL SQ | NOT ( a -op ANY SQ ) |
| a IN (SELECT b WHERE d) | ThereExists( a = b AND d) |
| EXISTS (SELECT b WHERE d ) | ThereExists( d ) |
| a < ANY (SELECT b WHERE d ) | ThereExists( a < b AND d ) |
| a > ANY (SELECT b WHERE d ) | ThereExists( a > b AND d ) |
| a <= ANY (SELECT b WHERE d ) | ThereExists( a <= b AND d ) |
| a >= ANY (SELECT b WHERE d ) | ThereExists( a >= b AND d ) |
| a <> ANY (SELECT b WHERE d ) | ThereExists( a <> b AND d ) | where "a", "b", and "c" represent arbitrary names or expressions or sequences of names or expressions, "d" an arbitrary boolean expression, "SQ" a subquery, "T", "F" and "U" represent respectively the values TRUE, FALSE and UNKNOWN, "op" represents a comparison operator and "-op" the complementary comparison operator.

8. The computer-implemented method of claim 7 in which the ThereExists expressions comprise a ThereExists function having the following properties:

| A | {T,U,F} | {T,U} | {T,F} | {U,F} | {T} | {U} | {F} | {} |
| --- | --- | --- | --- | --- | --- | --- | --- | --- |
| ThereExists (a) | T | T | T | U | T | U | F | F | where "T", "F" and "U" represent the values TRUE, FALSE and UNKNOWN, respectively.

9. The computer-implemented method of claim 5 in which the step of transforming the truth expression by iteratively applying a set of 3-valued to 2-valued logic rules comprises the step of applying the following transformation rules:

| From | To |
| --- | --- |
| (a IS tr1) OR (a IS tr2) | NOT( a IS tr3 ) |
| TRUE IS tr | tr=TRUE |
| FALSE is tr | tr=FALSE |
| UNKNOWN is tr | tr=UNKNOWN |
| (a OR b OR ...) IS TRUE | (a IS TRUE) OR (b IS TRUE) OR ... |
| (a OR b OR ...) IS FALSE | (a IS FALSE) AND (b IS FALSE) AND ... |
| (a OR b) IS UNKNOWN | NOT (a OR b IS TRUE) AND NOT (a OR b IS FALSE) |
| (a AND b) IS UNKNOWN | NOT (a AND b IS TRUE) AND NOT (a AND b IS FALSE) |
| (a AND b AND ...) IS TRUE | (a IS TRUE) AND (b IS TRUE) AND ... |
| (a AND b AND ...) IS FALSE | (a IS FALSE) OR (b IS FALSE) OR ... |
| (NOT a) IS TRUE | a IS FALSE |
| (NOT a) IS FALSE | a IS TRUE |
| (NOT a) IS UNKNOWN | a IS UNKNOWN |
| (a IS tr) IS TRUE | a IS tr |
| (a IS tr) IS UNKNOWN | False |
| (a IS tr) IS FALSE | NOT (a IS tr) |
| (a op b) IS TRUE | a op b |
| (a <> b) IS FALSE | a = b |
| (a < b) IS FALSE | a >= b |
| (a <= b) IS FALSE | a > b |
| (a = k) IS FALSE | a ={−infinity..Prev(k),Next(k)..infinity} |
| (a = b) IS FALSE | a <> b |
| (a op b) IS UNKNOWN | a={null} OR b={null} |
| ThereExists(a) IS TRUE | ThereExists(a IS TRUE) |
| ThereExists(a) IS FALSE | NOT ThereExists( NOT (a IS FALSE) ) |
| ThereExists(a) IS UNKNOWN | NOT ThereExists(a IS TRUE) AND ThereExists (a IS UNKNOWN) |
| a IS NOT NULL | a = {−infinity..infinity} |
| a IS NULL | a = {null} | where "tr" represents an arbitrary truth value, "tr1", "tr2" and "tr3" represent a permutation of the three possible truth values, "a", "b", represent expressions in the SQL language, and "k" represents a constant.

10. The computer-implemented method of claim 7 in which the step of transforming the truth expression by iteratively applying a set of 3-valued to 2-valued logic rules comprises the step of applying the following transformation rules:

| From | To |
| --- | --- |
| (a IS tr1) OR (a IS tr2) | NOT( a IS tr3 ) |
| TRUE IS tr | tr=TRUE |
| FALSE is tr | tr=FALSE |
| UNKNOWN is tr | tr=UNKNOWN |
| (a OR b OR ...) IS TRUE | (a IS TRUE) OR (b IS TRUE) OR ... |
| (a OR b OR ...) IS FALSE | (a IS FALSE) AND (b IS FALSE) AND ... |
| (a OR b) IS UNKNOWN | NOT (a OR b IS TRUE) AND NOT (a OR b IS FALSE) |
| (a AND b) IS UNKNOWN | NOT (a AND b IS TRUE) AND NOT (a AND b IS FALSE) |
| (a AND b AND ...) IS TRUE | (a IS TRUE) AND (b IS TRUE) AND ... |
| (a AND b AND ...) IS FALSE | (a IS FALSE) OR (b IS FALSE) OR ... |
| (NOT a) IS TRUE | a IS FALSE |
| (NOT a) IS FALSE | a IS TRUE |
| (NOT a) IS UNKNOWN | a IS UNKNOWN |
| (a IS tr) IS TRUE | a IS tr |
| (a IS tr) IS UNKNOWN | False |
| (a IS tr) IS FALSE | NOT (a IS tr) |
| (a op b) IS TRUE | a op b |
| (a <> b) IS FALSE | a = b |

-continued

| From | To |
|---|---|
| (a < b) IS FALSE | a >= b |
| (a <= b) IS FALSE | a > b |
| (a = k) IS FALSE | a ={-infinity..Prev(k),Next(k)..infinity} |
| (a = b) IS FALSE | a <> b |
| (a op b) IS UNKNOWN | a={null} OR b={null} |
| ThereExists(a) IS TRUE | ThereExists(a IS TRUE) |
| ThereExists(a) IS FALSE | NOT ThereExists( NOT (a IS FALSE) ) |
|  | NOT ThereExists(a IS TRUE) AND |
| ThereExists(a) IS UNKNOWN | ThereExists(a IS UNKNOWN) |
| a IS NOT NULL | a = {-infinity..infinity} |
| a IS NULL | a = {null} | where "tr" represents an arbitrary truth value, "tr1", "tr2" and "tr3" represent a permutation of the three possible truth values, "a", "b", represent expressions in the SQL language, and "k" represents a constant.

11. The computer-implemented method of claim 9 in which the ThereExists expressions comprise a ThereExists function having the following properties:

| a | {T,U,F} | {T,U} | {T,F} | {U,F} | {T} | {U} | {F} | {} |
|---|---|---|---|---|---|---|---|---|
| ThereExists (a) | T | T | T | U | T | U | F | F | where "T", "F" and "U" represent the values TRUE, FALSE and UNKNOWN, respectively.

12. The computer-implemented method of claim 10 in which the ThereExists expressions comprise a ThereExists function having the following properties:

| A | {T,U,F} | {T,U} | {T,F} | {U,F} | {T} | {U} | {F} | {} |
|---|---|---|---|---|---|---|---|---|
| ThereExists (a) | T | T | T | U | T | U | F | F | where "T", "F" and "U" represent the values TRUE, FALSE and UNKNOWN, respectively.

13. The computer-implemented method of claim 5 in which the step of transforming the second step expression by iteratively applying a set of NOT removal rules comprises the step of applying the following transformation rules:

| From | To |
|---|---|
| ThereExists(a) | A |
| NOT ( a AND b AND ... ) | (NOT a) OR (NOT b ) OR ... |
| NOT ( a OR b OR ... ) | (NOT a) AND (NOT b ) AND ... |
| NOT (NOT a) | A |
| NOT (a < k) | A = {null,k..infinity} |
| NOT (k < b) | B = {null,-infinity..k} |
| NOT (a <= k) | A = {null,Next(k)..infinity} |
| NOT (k <= b) | B = {null,-infinity..Prev(k)} |
| NOT (a <> k) | A = k |
| NOT (a = k) | A = {-infinity..Prev(k),Next(k)..infinity} |
| NOT (a = b) | A<>b OR a={null} OR b={null} |
| NOT (a <> b) | A=b OR a={null} OR b={null} |
| NOT (a < b) | a>=b OR a={null} OR b={null} |
| NOT (a <= b) | a>b OR a={null} OR b={null} |
| NOT( ThereExists(a) ) | MINUS( true, a ) | where a set of values enclosed in curly braces indicates that any of the values in the set may satisfy the condition, the value "a . . . b" compares equal to any value between and including "a" and "b", "Prev(k)" and "Next(k)" represent the previous, and next values to "k" for the data type of "k", respectively, and the MINUS operator is the set difference operator.

14. The computer-implemented method of claim 7 in which the step of transforming the second step expression by iteratively applying a set of NOT removal rules comprises the step of applying the following transformation rules:

| From | To |
|---|---|
| ThereExists (a) | A |
| NOT ( a AND b AND ... ) | (NOT a) OR (NOT b ) OR ... |
| NOT ( a OR b OR ... ) | (NOT a) AND (NOT b ) AND ... |
| NOT (NOT a) | A |
| NOT (a < k) | A = {null,k..infinity} |
| NOT (k < b) | B = {null,-infinity..k} |
| NOT (a <= k) | A = {null,Next(k)..infinity} |
| NOT (k <= b) | B = {null,-infinity..Prev(k)} |
| NOT (a <> k) | A = k |
| NOT (a = k) | A = {-infinity..Prev(k),Next(k)..infinity} |
| NOT (a = b) | A<>b OR a={null} OR b={null} |
| NOT (a <> b) | A=b OR a={null} OR b={null} |
| NOT (a < b) | a>=b OR a={null} OR b={null} |
| NOT (a <= b) | a>b OR a={null} OR b={null} |
| NOT( ThereExists(a) ) | MINUS( true, a ) | where a set of values enclosed in curly braces indicates that any of the values in the set may satisfy the condition, the value "a . . . b" compares equal to any value between and including "a" and "b", "Prev(k)" and "Next(k)" represent the previous, and next values to "k" for the data type of "k", respectively, and the MINUS operator is the set difference operator.

15. The computer-implemented method of claim 13 in which the ThereExists expressions comprise a ThereExists function having the following properties:

| A | {T,U,F} | {T,U} | {T,F} | {U,F} | {T} | {U} | {F} | {} |
|---|---------|-------|-------|-------|-----|-----|-----|-----|
| ThereExists (a) | T | T | T | U | T | U | F | F | where "T", "F" and "U" represent the values TRUE, FALSE and UNKNOWN, respectively.

16. The computer-implemented method of claim 14 in which the ThereExists expressions comprise a ThereExists function having the following properties:

| A | {T,U,F} | {T,U} | {T,F} | {U,F} | {T} | {U} | {F} | {} |
|---|---------|-------|-------|-------|-----|-----|-----|-----|
| ThereExists (a) | T | T | T | U | T | U | F | F | where "T", "F" and "U" represent the values TRUE, FALSE and UNKNOWN, respectively.

17. A computer program product comprising a computer usable medium tangibly embodying computer readable program code means for transforming an SQL query, the computer readable program code means comprising code means for carrying out the steps of the method of claim 5.

18. A computer program product comprising a computer usable medium tangibly embodying computer readable program code means for transforming an SQL query, the computer readable program code means comprising code means for carrying out the steps of the method of claim 6.

19. A computer program product comprising a computer usable medium tangibly embodying computer readable program code means for transforming an SQL query, the computer readable program code means comprising code means for carrying out the steps of the method of claim 7.

20. A computer program product comprising a computer usable medium tangibly embodying computer readable program code means for transforming an SQL query, the computer readable program code means comprising code means for carrying out the steps of the method of claim 8.

21. A computer program product comprising a computer usable medium tangibly embodying computer readable program code means for transforming an SQL query, the computer readable program code means comprising code means for carrying out the steps of the method of claim 9.

22. A computer program product comprising a computer usable medium tangibly embodying computer readable program code means for transforming an SQL query, the computer readable program code means comprising code means for carrying out the steps of the method of claim 10.

23. A computer program product comprising a computer usable medium tangibly embodying computer readable program code means for transforming an SQL query, the computer readable program code means comprising code means for carrying out the steps of the method of claim 11.

24. A computer program product comprising a computer usable medium tangibly embodying computer readable program code means for transforming an SQL query, the computer readable program code means comprising code means for carrying out the steps of the method of claim 12.

25. A computer program product comprising a computer usable medium tangibly embodying computer readable program code means for transforming an SQL query, the computer readable program code means comprising code means for carrying out the steps of the method of claim 13.

26. A computer program product comprising a computer usable medium tangibly embodying computer readable program code means for transforming an SQL query, the computer readable program code means comprising code means for carrying out the steps of the method of claim 14.

27. A computer program product comprising a computer usable medium tangibly embodying computer readable program code means for transforming an SQL query, the computer readable program code means comprising code means for carrying out the steps of the method of claim 15.

28. A computer program product comprising a computer usable medium tangibly embodying computer readable program code means for transforming an SQL query, the computer readable program code means comprising code means for carrying out the steps of the method of claim 16.

29. A computer program product comprising a computer usable medium tangibly embodying computer readable program code means for transforming an SQL query, the computer readable program code means comprising code means for carrying out the steps of the method of claim 1.

30. A computer program product comprising a computer usable medium tangibly embodying computer readable program code means for transforming an SQL query, the computer readable program code means comprising code means for carrying out the steps of the method of claim 2.

31. A computer program product comprising a computer usable medium tangibly embodying computer readable program code means for transforming an SQL query, the computer readable program code means comprising code means for carrying out the steps of the method of claim 3.

32. A computer program product comprising a computer usable medium tangibly embodying computer readable program code means for transforming an SQL query, the computer readable program code means comprising code means for carrying out the steps of the method of claim 4.

* * * * *